April 17, 1928.

F. GROSSE 1,666,852

SLOT SHUTTER MECHANISM FOR PHOTOGRAPHIC CAMERAS

Filed March 4, 1927 5 Sheets-Sheet 1

INVENTOR
FRIEDRICH GROSSE
by his Attorneys
Howson and Howson

April 17, 1928. 1,666,852
F. GROSSE
SLOT SHUTTER MECHANISM FOR PHOTOGRAPHIC CAMERAS
Filed March 4, 1927 5 Sheets-Sheet 3

INVENTOR
FRIEDRICH GROSSE
by his Attorneys
Howson and Howson

April 17, 1928. 1,666,852
F. GROSSE
SLOT SHUTTER MECHANISM FOR PHOTOGRAPHIC CAMERAS
Filed March 4, 1927 5 Sheets-Sheet 5

INVENTOR
FRIEDRICH GROSSE
by his Attorneys
Howson and Howson

Patented Apr. 17, 1928.

1,666,852

UNITED STATES PATENT OFFICE.

FRIEDRICH GROSSE, OF JENA, GERMANY.

SLOT-SHUTTER MECHANISM FOR PHOTOGRAPHIC CAMERAS.

Application filed March 4, 1927, Serial No. 172,827, and in Germany September 18, 1924.

This invention relates to a device for setting "slot" shutters of photographic cameras with the help of a setting disc influencing the operating mechanism.

With known arrangements of this kind for the regulation of the times of exposure two special operations are necessary, one for adjusting the width of the slot, the other for varying the tension of the spring. As compared with this, the invention refers to a construction wherein by turning the setting disc in one direction, for instance in a clockwise direction, from its normal position (time exposure), the shorter exposures (for instance from 1/10th to 1/1500th second) are obtained by altering the width of the slot and the tension of the spring, whilst by turning in the opposite direction the longer exposures (for instance from 1 to 1/4 second) are obtained by means of a special time regulator.

In the accompanying drawings a device constructed according to the invention is shown.

1 is the setting disc of the slot shutter effecting the adjustment of the shutter both for quick and slow instantaneous exposures as also for time exposures. It is provided with two scales each extending over a half circle (Fig. 1) one of which shows the time exposure and the quick instantaneous exposures, for instance from 1/10th to 1/1500th of a second, whilst the other shows the slow exposures from 1 to 1/4 of a second. The disc 1 is in its normal position, when the index line Z (time exposure) is opposite to the stationary zero mark on the casing, so that by turning the disc 1 in the one or the other direction the shutter is set either by the one or the other of the scales.

In the constructional embodiment shown in the drawing the scale for the quick instantaneous exposures for instance from 1/10th to 1/1500th of a second, is brought into position by turning the disc 1 to the right (clockwise), the scale for the slow instantaneous exposures by turning the disc to the left (counter clockwise), so that in the first case the velocity of exposure of the shutter mechanism is varied from 1/10th to 1/1500th of a second by reducing the width of the slot and increasing the tension of the spring, whilst in the other case the velocity of exposure is also increased, but with a slot having its full width and with the normal tension of the spring.

Figures 1, 2, 3:
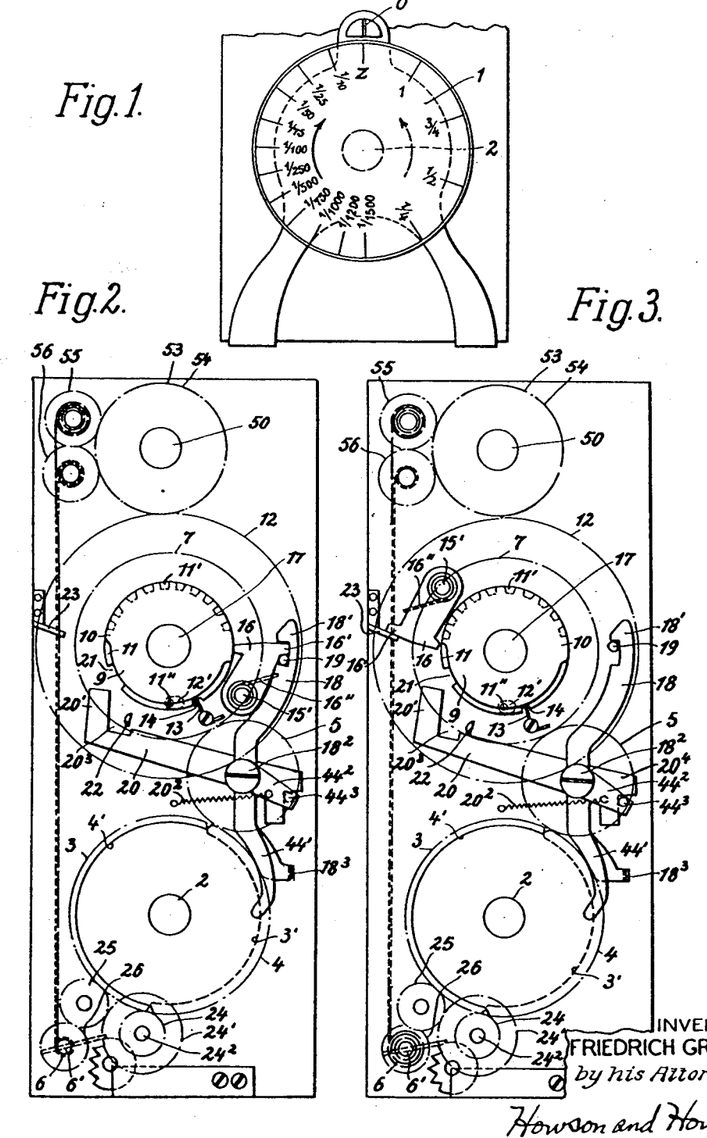
Fig. 1 is a front elevation of the setting disc.
Figs. 2 and 3 are sections through the device on the line A—B of Fig. 10, showing the position of the parts for time exposures before and after the release of the lower blind.
Figures 10, 11, 12, 13, 14:
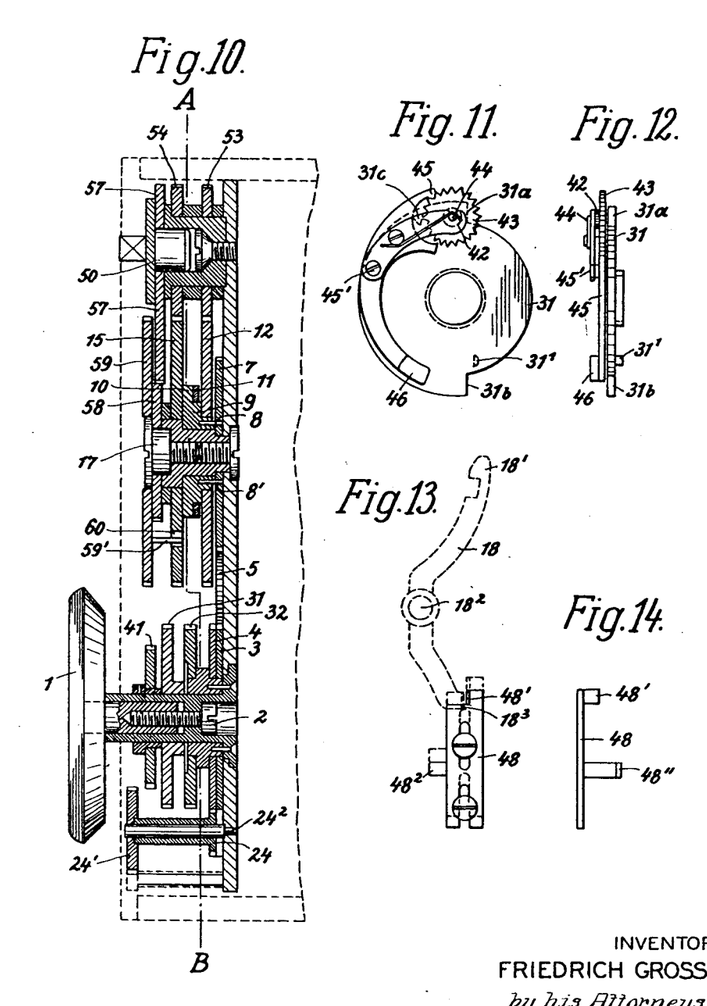
Fig. 10 is a transverse section of the device.
Figs. 11 and 12 show the time regulator in front and side elevation.
Figs. 13 and 14 show the locking device for locking the releasing lever in plan and in side elevation.

The disc 1 is mounted on a spindle 2 rotatably arranged on the base plate of the mechanism and carrying also two toothed wheels 3 and 4, the first of which operates the device regulating the width of the slot of the shutter by means of an intermediate gear wheel 5, whilst the toothed wheel 4 varies the tension of the spring 6 operating the blinds. The intermediate wheel 5 meshes with a toothed wheel 7 loosely mounted on a spindle 17 and connected by means of one or more pins 8, 8¹ (Fig. 10) with a bushed wheel 9 which also rotates on the spindle 17 and is provided at the outer end with a portion 10 projecting beyond its periphery (Figs. 2 and 3).

Figure 4:
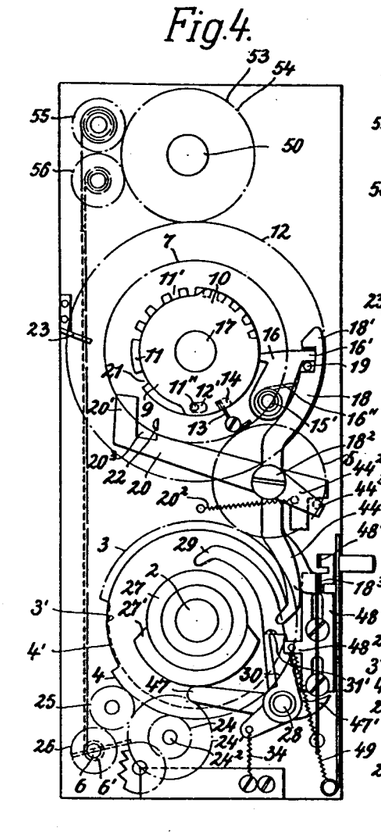
Figs. 4 and 5 are similar sections after setting the device to for instance 1/100th of a second before the release of the lower or of the upper blind respectively.
Figure 5:
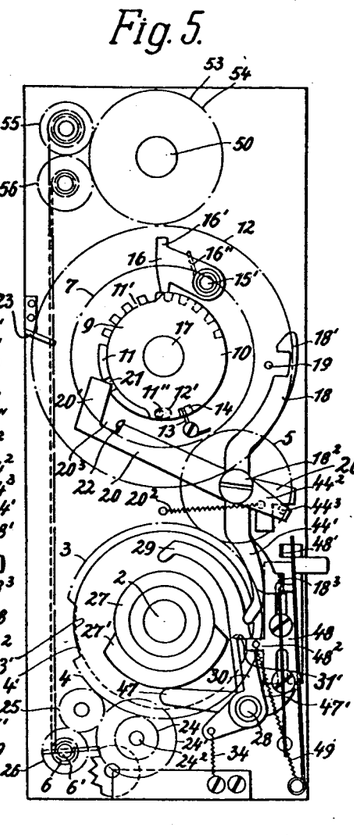

Rotatable about and carried by the bushed wheel 9 is a ring 11 which is provided for a portion of its periphery with notches 11′ (Figs. 2 and 5) which on the rotation of the wheel 9 are adapted to be covered in succession by the projecting portion 10 so that the notches 11′ become inoperative. By turning the wheel 9 and the projecting portion 10 by means of the wheel 5 operated by the setting disc 1 one or more or all of the notches 11′ of the ring 11 can be covered. Between the notched ring 11 and the toothed wheel 7 there is mounted rotatably on the boss of the wheel 9 a toothed wheel 12 which is provided with a recess 12′ into which a pin 11″ attached to the notched ring 11 is projecting with a certain amount of play. A spring 13 attached to the wheel 12 engages with its end in a slot 14 of the notched ring 11 and holds the latter resiliently in the left of its end positions limited by the recess 12′ (Figs. 2 to 5). In front of the toothed wheel 12 which controls the movement of the upper blind a second toothed wheel 15 (Figs. 8, 9 and 10) is rotatably arranged on the bushed wheel 9 which regulates the movement of the lower blind. On this toothed wheel 15 is a pawl or catch 16 pivoted on a pin 15′ thereon. The locking tooth thereof has an oppositely directed extension 16′ and the catch is under the influence of a spring 16″ in such a way that its locking tooth is always held pressed against the projecting portion 10 of the wheel 9 or in one of the notches 11″ and as a matter of fact always in the first notch left free after the movement away of the projecting portion 10 covering the notches (Figs. 4 and 5). At the rotation of the wheel 15 in a counter clockwise direction therefore the catch 16 will slide inoperatively on the projecting portion 10 of the wheel 9 until it falls into the first free notch 11′ of the notched ring 11 and turns the latter to an extent corresponding to the rotation of the wheel 15 as limited by the recess 12′ in the wheel 12. The two toothed wheels 15 and 12 are under the control of a locking tooth 18¹, which is provided at the end of a releasing lever 18 pivoted at 18², whilst a pin 19 attached to the wheel 12 and the extension 16′ of the catch 16 come under this tooth, so that a rotation of the wheels 12 and 15 is prevented until the releasing lever 18 is operated. On the pivot 18² of the releasing lever 18 is rotatably mounted a locking lever 20 (Figs. 2 to 5), the locking tooth 20¹ of which engages on the rotation of the lever 20 on its pivot under the influence of a spring 20² held in the position of tension by the releasing lever 18, in a special notch 21 in the notched ring 11 and comes with a notch 20³ in the path of a pin 22 attached to the wheel 12, so that a rotation of the latter is prevented if during the operation of the releasing lever 18 the extension 16′ of the catch 16 resting in the notch of the locking tooth 18¹ of the releasing lever 18 is released. The catch 16 can slide over the projecting portion 10 of the wheel 9 until it drops into the first notch 11′ beyond the projecting portion 10. During this movement of the wheel 15 only the lower blind runs off and thus produces between itself and the upper blind the exposure gap, the width of which depends from the number of the notches 11′ of the notched ring 11 covered by the projecting portion 10.

The push generated by the engagement of the catch 16 with one of the notches 11′ of the ring 11 imparts to the latter against the action of the spring 13 a slight movement depending from the width of the recess 12′ of the wheel 12, but being sufficient for enabling the side wall of the notch 21 to push back the nose 20′ of the lever 20 and thereby to release the halfround pin 22, which rests in the notch 20³ of the lever 20. This in turn releases the wheel 12 which then rotates with the wheel 15 under the influence of the spring 6, maintaining the width of gap determined by the notched ring 11 in cooperation with the catch 16. It will be noted that the catch 16 constitutes the coupling between the two wheels 12 and 15, whereby the catch 16 constitutes the coupling between the two wheels 15 and 12. When the catch 16 comes to the end of its movement i. e., when the lower blind has finished its travel, the extension 16¹ of the catch strikes against a stationary resilient projection 23 which limits the movement thereof, takes the jar and at the same time raises the catch 16 out of engagement with the notch 11¹ in the ring 11. Thereupon the wheel 12 can run alone under the influence of the spring 6 operating the blinds, until the pin 19 secured to the wheel 12 strikes against the catch 16 resting on the projection 23. By this movement of the wheel 12 the gap between the two blinds is closed.

For time exposures that is if the sign Z of the setting disc 1 is opposite to the sign O of the casing, the whole of the notches 11′ of the notched ring 11 are covered by the projecting portion of the wheel 9, so that the release of the pin 22 cannot be effected by the notched ring 11. In this case a second pressure on the releasing lever 18 is necessary, by which the pin 19 of the wheel 12 is released by the nose 18¹ of the releasing lever 18, whereupon the upper blind can run off under the action of the spring 6.

The tensioning of the spring 6 for operating the blinds is effected by the toothed wheel 4 on the spindle 2 which engages with a toothed wheel 24 located together with a toothed wheel 24¹ of greater diameter on a pivot 24². The wheel 24¹ is in engagement with one portion of a double pinion 25, the other portion of which meshes with a toothed wheel 26 secured to the axle 6′ of the spring 6.

The springs 6 possess a certain amount of initial stress which is just sufficient to draw down the two blinds with a determined velocity, if the setting disc is set to time exposure or to slow instantaneous exposure for which the total width of the gap is employed. For preventing the setting disc at these settings of the shutter mechanism from effecting a displacement of the projecting portion 10 of the wheel 9 and from tensioning the springs 6, the toothed wheels 3 and 4 are provided with portions having no teeth, which on turning the setting disc to the left come opposite to the engaging portion of the intermediate wheel 5 for the displacement of the projecting portion 10 of the wheel 9 and to the engaging portion of the toothed wheel 24 for varying the tension of the springs 6 and therefore cannot cause a rotation of these two wheels 5 and 24.

The regulation of the moment for releasing the upper blind at slow instantaneous exposures, that is to say between 1 and 1/4 of a second is effected by a mechanism which will now be described.

Attached to the toothed wheel 4 or integral therewith is a cam disc 27, one part of which forms a segment-shaped cam 27' arranged with respect to the non-toothed parts 3' and 4' of the wheels 3 and 4 in such a manner, that it is operative only during the idle period of the wheels 3 and 4 and influences a contact-lever 29 pivotally mounted on a pin 28. One end of this contact-lever 29 is raised by the cam 27' and thereby a second locking lever 30 in rigid connection therewith is brought out of the path of a pin 31¹, which is attached to a disc 31 loosely arranged on the pivot 2 and which is in the path of a second pin 33 fixed to a toothed wheel 32 which is also loosely arranged on the pivot 2. A spring 34 tends to keep the lever 29 always in contact with the cam-disc 27. This toothed wheel 32 is in connection with the mechanism for winding-up the blinds, which will be described later, by the toothed wheels 35, 36 and 37 (Figs. 8 and 9), so that by operating the winding-up mechanism the wheel 32 (Fig. 10) is also put in rotation. This rotation of the wheel 32 is utilized for setting the time regulator because the pin 33 attached to the wheel 32 is acting upon the pin 31¹ and is dragging the latter with it at the movement of the wheel 32 until the disc 31 is stopped by a lever 40 which is described hereafter.

The pin 33 and the pin 31¹ are so dimensioned and arranged that the first one is always beyond the reach of the locking lever 30 and the latter only when this locking lever is drawn back, that is to say when the setting disc 1 is adjusted for slow instantaneous exposes and when the lever 29 rests on the projecting portion 27' of the cam-disc 27. The disc 31 is provided with a segment-shaped recess on its periphery, so that two projecting faces 31ᵃ and 31ᵇ are produced limiting the movements of the disc 31. The disc 31 is influenced by a spring 38, one end of which is attached to the hub of the disc 31 and the other end to a pin 39 on the baseplate, so that by a rotation of the disc 31 in a counter-clockwise direction the spring 38 is put under tension. Furthermore the disc 31 is provided on its periphery with a notch 31ᶜ with which the end of the above mentioned releasing lever 40 engages and which on the running off of the lower blind is released by the releasing lever 40 when the latter is oscillated around its pivot by means of a pin 15² attached to the wheel 15. By this movement of the lever 40 the time regulator is released so that the disc 31 begins to rotate and can return in its initial position under the influence of the spring 38. The two extreme positions of the disc 31 are determined by the projecting faces 31ᵃ and 31ᵇ of the same, one of which in the one end position, the other of which in the other end position comes into contact with a projection, the operation of which will be described later. In order to prevent the disc 31 from returning suddenly under the action of the spring 38 from the tensioned position to the rest position there is provided a disc 41 above the disc 31 on the pivot 2, the periphery of which is partly provided with teeth and which is turned on the rotation of the setting disc 1. The disc 41 is secured to the spindle 2 in such a manner that on the rotation of the disc 1 in the left direction to a position for slow instantaneous exposures according to the time of exposure desired a greater or less portion of the toothed sector of the disc 41 comes within the reach of a toothed gear 42 in engagement therewith, which is mounted together with a larger locking wheel 43 on an axle 44 on the disc 31. The axle 44 is under the action of springs, so that the gear 42 and the locking wheel 43 are kept in position with respect to the disc 31. A two-armed locking lever 45 engages the locking wheel 43. This locking lever is rotatably mounted at 45ᵃ on the disc 31 and its opposite end is provided with a weight 46. By the alternating engagement of the two arms of the lever 45 in the locking wheel the running off of the gear 42 under the action of the spring 38 transmitted to the disc 31 is retarded in the same manner as by the anchor-escapement of a watch. A greater portion of the toothed sector of the wheel 41 comes within the reach of the toothed gearing 42 in proportion as a greater length of time elapses, until the end of the toothed portion is reached. In this way the duration of the slow instantaneous exposure is regulated. If for instance the disc 1 is set to an exposure of 1 second then the whole toothed portion of the wheel 41 comes within the reach of the toothed gearing 42, so that this latter requires a longer time to reach the end of the toothed portion of the wheel 41 and to release the upper blind. The farther the disc 1 is turned to the left the shorter will be the time of exposure and the farther also will the toothed wheel 41 be turned to the left, so that a progressively shorter portion of the teeth of the gear 41 have to be rolled off before the gear 42 becomes disengaged from the teeth of the wheel 41 and under the unrestrained operation of the spring finishes its movement, at the end of which the upper blind is released.

The release of the lower blind is effected by the releasing lever 18, by which the toothed wheel 15 controlling the movement of the lower blind is released.

The releasing of the second or the upper blind is effected by the projection 31$^a$ of the disc 31 pushing against a lever 44$^1$, 44$^2$ which is located pivotally on the same axle 18$^2$ as the releasing lever 18 for the lower blind and the locking lever 20 for the upper blind. The lever 44$^1$, 44$^2$ is of bell crank form and is so shaped that one of its arms 44$^1$ slides on the circumference of the recess between the projections 31$^a$ and 31$^b$ of the disc 31 whilst the other arm 44$^2$ carries a pin 44$^3$ which on the oscillation of the arm 44$^1$ by the projecting surface 31$^a$ of the disc 31 pushes against the extension 20$^4$ of the locking lever 20 and releases the pin 22 attached to the wheel 12, so that the second blind can run down.

Whilst the contact lever 29 sliding from the cam 27$^1$ of the cam disc 27 and the lever 30 fixed to this lever cause a stoppage of the time regulator during the rapid exposures (for instance from 1/10th to 1/1500th of a second), by locking the pin 31$^1$ of the disc 31, a device must also be provided which prevents the pin 19 of the wheel 12 controlling the upper blind from being locked by the locking nose 18$^1$ of the releasing lever 18, if this lever is again released before the release of the pin 22 of the wheel 12.

Figures 8, 9:
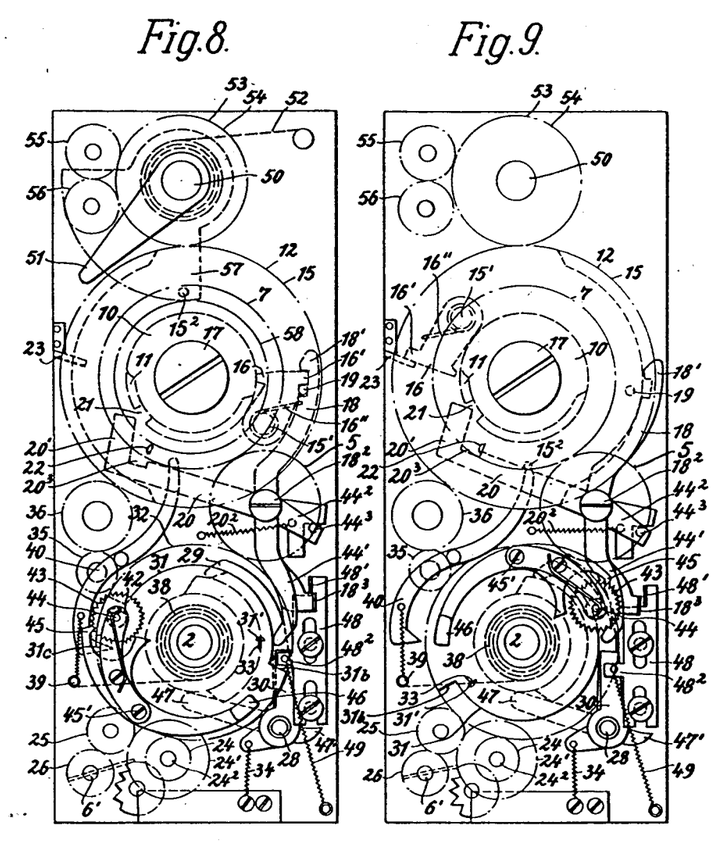
Figs. 8 and 9 are elevations of the device showing the parts in the position for slow time exposure before the release of the lower blind or before the release of the upper blind respectively by the running off of the time regulator.

For this purpose a locking means is provided for the lever 18, which prevents the latter from arresting the pin 19 when the lever 18 is freed, before the upper blind has been released. (Figs. 8 and 9.) This arrangement consists of a two armed lever 47 pivoted on a pin 28, one arm of which rests upon the periphery of the cam 27' or on that of the cam disc 27 according as the setting disc 1 is set for the rapid or for the slow exposures, while the other arm is acting upon a slide 48 on the base plate in such a manner, that when setting for slow exposures for instance from 1 to 1/4 of a second this slide under the influence of a spring 49 can sink down and thereby brings a projection 48$^1$ on the slide 48 in the reach of a projection 18$^3$ of the releasing lever 18 and in such a way that on releasing the shutter mechanism by the lever 18 this projection 48$^1$ does not prevent a movement of the lever 18 in the releasing direction, but then under the action of the spring 49 sinks down and prevents the projection 18$^3$ of the lever 18 from returning to their normal position. As a result moreover the locking pin 19 is no longer under the influence of the locking tooth 18$^1$ of the releasing lever 18, so that this latter in the case of too early release does not cause a locking of the pin 19 and consequently of the upper blind. However, for making the lever 18 again ready for operation, the slide 48 is provided with a second projection 48$^2$ which comes into the path of the projecting surface 31$^b$ of the disc 31 in such a way that at the end of the movement of the disc 31 it is operated by this projecting surface and a lifting of the slide 48 is effected, whereupon the projection 48$^1$ releases the projection 18$^3$ of the releasing lever 18 and this latter is enabled to return to its normal position.

If, however, the setting disc 1 is turned to a rapid exposure then the lever 47 rests on the cam 27' of the cam disc 27 which participates in the movement of the setting disc 1 and its other arm raises the slide 48 against the stress of the spring 49, so that the releasing lever 18 during the high velocity movements of the shutter cannot be prevented from returning to its normal position by the slide 48, because the projection 48$^1$ has been removed out of the reach of the projection 18$^3$ of the releasing lever 18 (Figs. 4 and 5).

The tensioning of the shutter mechanism, that is to say the drawing up of the two blinds is effected by means of a lever 51 operating a roller 50 (Fig. 8) under the action of a spring 52. 53 and 54 are two loose toothed wheels which engage on the one hand with the toothed wheels 12 and 15 and with two toothed wheels 55 and 56, fastened on the axles of the two blinds, on the other hand. Secured to the spindle 50 is a toothed sector 57, which engages a toothed wheel 58 which is located loosely on the spindle 17 and is fixedly connected to a toothed wheel 59. This toothed wheel 59 has at its lower side a pin 59', which engages in a part circular groove 60 on the wheel 15 and on winding up comes against a stop therein, so that the wheel 15 and through the extension 16' of the pawl 16 the wheel 12 is moved therewith, because the pawl 16 is in contact with the pin 19 of the wheel 12. The return of the winding lever 51 connected to the toothed sector 57 is effected by the spring 52 one end of which is connected to the spindle of the winding lever 51, whilst the other end is fastened to the base plate.

The operation of the device is as follows:

It is assumed, that the setting disc 1 is in the position shown in Fig. 1 and that a time exposure is to be made.

In this position of the disc 1 all the parts are in their normal position. The blinds are drawn up by the winding mechanism and the springs 6 have their normal tension. The catch 16 and the pin 19 are stopped by the locking tooth 18$^1$ of the releasing lever 18, and the notches 11$^1$ of the notched ring 11 are entirely covered by the projecting portion 10 of the wheel 9. The wheels 3 and 4 are out of engagement with the wheels 5 and 24 by reason of their portions 3' and 4' not provided with teeth (Figs. 2 and 3). If now the releasing lever 18 is operated then the extension 16' of the pawl 16 is released from the locking tooth 18¹ of the releasing lever 18, so that the wheel 15 begins to rotate under the action of the spring 6 and the lower blind runs down. As the notches 11¹ of the notched ring 11 are entirely covered it follows that the pawl 16 on the wheel 15 cannot fall in any of the notches 11¹ and cannot impart to the notched ring 11 any rotation to free the pin 22. The lower blind therefore rolls entirely off. The upper blind on the other hand is held fixed by the pin 22 which enters the notch 20³ of the locking lever 20, which has been brought into operation by the movement of the releasing lever 18 under the influence of the spring 20². If then the releasing lever 18 is liberated, the locking tooth 18¹ thereof comes again within the reach of the pin 19 on the wheel 12, whilst the pin 22 is released by the locking lever 20, so that the upper blind is held by the locking tooth 18¹ of the releasing lever 18, until by a second pressure on the releasing lever 18 the pin 19 is liberated, so that the wheel 12 can begin to run and the upper blind rolls off under the influence of its spring 6 (Figs. 2 and 3).

If the shutter mechanism is to work for instance with an exposure of 1/100th of a second, then the disc 1 is turned in the direction of the full line arrow, namely in a clockwise direction, until the indicating line 1/100 comes opposite to the stationary sign O (Figs. 4 and 5). By this rotation of the disc 1 by means of the toothed wheel 3 attached to the spindle 2 and the intermediate wheel 5 the toothed wheel 7 loosely mounted on the pin 17 and the bush wheel 9 coupled to this latter by means of the pins 8, 8' are turned together with the projecting portion 10, so that this latter opens the corresponding number of notches 11¹ of the ring 11. At the same time by means of the toothed wheels 4, 24, 24', 25 and 26 the springs 6 are stressed above their initial tension, so that the velocity of the movement of the blinds becomes greater corresponding to the shorter time of exposure. Through the winding mechanism the two wheels 12 and 15 controlling the blinds have been turned so that both the pin 19 of the wheel 12 as also the pawl 16 pivoted on the wheel 15 are stopped by the releasing lever 18. If now by operating the releasing lever 18 the extension of the pawl 16 and the pin 19 are released, in the first place only the wheel 15 can begin to run, because the locking lever 20 has also been released by the releasing lever 18, so that under the action of the spring 20² the nose 20¹ of the lever 20 engages with the notch 21 of the notched ring 11. By this movement of the lever 20 the pin 22 of the wheel 12 comes into the notch 20³ of the locking lever 20, so that the wheel 12 cannot turn, although the pin 19 has been liberated by the locking nose 18¹ of the releasing lever 18. The wheel 15 now begins to rotate and the lower blind to run off until the pawl 16 sliding over the projecting portion 10 of the wheel 9 falls into the first free notch 11¹ of the notched ring 11 (Figs. 4 and 5). As the notched ring 11 is not fixedly attached to the wheel 12, but merely through the intervention of the pin 11″ engaging the recess 12' of the wheel 12, a certain amount of play is allowed with respect to this wheel 12, so that when the pawl 16 falls into the first free notch 11¹, there is only a slight turning with respect to the wheel 12, but this is sufficient to cause the notch 21 to push back the nose 20¹ of the lever 20 and to remove or free the pin 22 from the notch 20³ of the locking lever 20, so that now again the wheel 12 can run down together with the wheel 15 whilst retaining the width of the slot between the two blinds as determined by the pawl 16. After the pawl 16 with its extension 16' has run round to the projection 23, the wheel 15 and at the same time the lower blind comes to rest. By means of the projection 23 the movement of the wheel 15 is damped and at the same time the pawl 16 is raised from the corresponding notch in the notched ring 11, so that the coupling between the two wheels 12 and 15 is released and the wheel 12 continues to run alone until the pin 19 arrives also on the pawl 16, during which movement the closing of the gap between the two blinds takes place.

The farther the setting disc 1 is turned in a clockwise direction the more the notches 11¹ of the notched ring 11 are opened by the projecting portion 10 of the wheel 9 and the greater becomes the power of the springs 6 operating the blinds as compared with their initial stress, so that at the last notch there is the smallest gap and the greatest tension of the springs and at the same time the most rapid exposure is obtained.

For slow exposures between 1 and 1/4 of a second, which are determined by the time regulator and by turning the setting disc 1 in the direction indicated by the dotted arrow in Fig. 1 an alteration of the width of the slot or gap and a variation of the tension of the springs 6 are not necessary. All slow instantaneous exposures are effected with the full width of the slot and under the initial stress of the operating springs. By the turning of the setting disc 1 to the left for slow instantaneous exposures, the portions 3' and 4', of the wheels 3 and 4 having no teeth come opposite to the toothed wheels 5 and 24, so that a rotation of these wheels is not effected as long as the setting disc 1 is turned in this direction.

Figure 6:
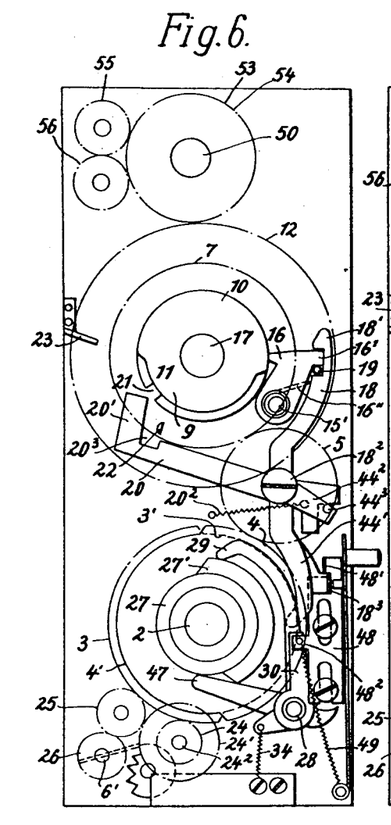
Figs. 6 and 7 are sectional views after setting the device to a slow time exposure for instance to 1 second and after the lower blind has run down.
Figure 7:
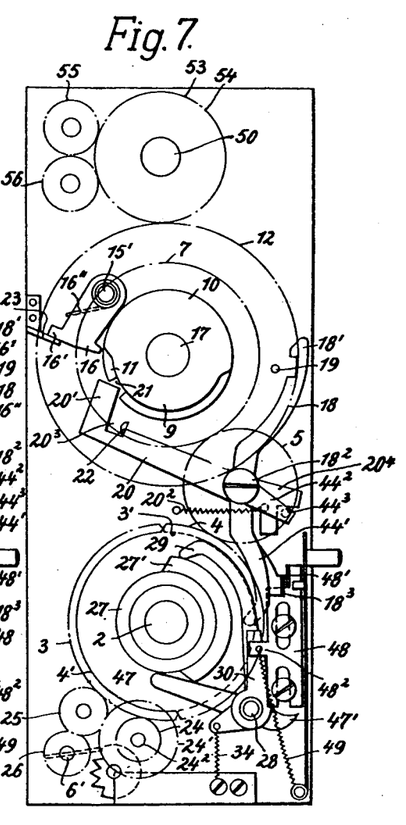

If the shutter mechanism is set by means of the winding device, the parts of the time regulator come into the positions shown in Figs. 6 to 8. By turning the setting disc 1 to the left, the cam disc 27 on the spindle 2 is also turned to the left, so that the cam portion 27' comes into contact with the lever 29 and turns this latter upon its axle 28 so that the lever 30 in rigid connection therewith is removed from the reach of the pin 31¹ of the disc 31 and this disc under the operation of its spring 38 is enabled to turn as soon as the locking lever 40 holding the disc 31 in its locked position by raising its locking tooth out of the notch 31ᶜ of the disc 31 frees the latter. By the rotation of the setting disc 1 also the lever 47 has been acted upon by the cam portion 27' of the cam disc 27. As a result the lever 47 is enabled to slide from this cam portion, so that the locking slide 48 can sink down under the action of its spring 49, as soon as the disc 31 begins to turn under the influence of its spring 38 and the projecting face 31ᵇ releases the projection 48² of the locking slide 48. By the rotation of the setting disc 1 in the direction of the dotted arrow in Fig. 1 the disc 41 which is fixed to the spindle 2 and which is partly provided with teeth, has also been turned so that according to the amount of the turning of the setting disc 1 in this direction a greater or lesser portion of the teeth of the disc 41 comes into the reach of the time regulator on the disc 31 or of the toothed gearing 42 so that this latter requires a longer or shorter time to run through the toothed portion of the disc 41 according to the length of the toothed sector in the reach of the gear wheel 42, until the projecting face 31ᵃ pushes against the lever 44¹ which causes the release of the wheel 12 by the locking lever 20, so that the upper blind can roll off (Figs. 8 and 9).

The release of the wheel 15 which controls the lower blind is effected in the same manner as in the case of the rapid instantaneous exposures, that is to say by means of the releasing lever 18 at first the pawl 16 and the wheel 15 are released, while the wheel 12 is held fast by the pin 22 resting in the notch 20³ of the locking lever 20. After the lower blind or the wheel 15 has completed its whole course the pin 15² on the wheel 15 comes against the locking lever 40 which is thereby raised out of the notch 31ᶜ of the disc 31, so that this latter becomes free and can begin to turn under the action of the spring 38, whereby the toothed gearing 42 runs over the toothed portion of the disc 41. After the toothed gearing 42 has left the toothed portion of the disc 41, the disc 31 can turn quickly under the full force of the spring 38, until the projecting face 31ᵃ of the disc 31 comes against the lever 44¹, whereby the latter turns upon its spindle 18², and the pin 44³ on other arm 44² of the lever is enabled to push against the extension 20⁴ of the locking lever 20, so that the pin 22 of the wheel 12 is released from the notch 20³ of the lever 20. The wheel 12 can now run off without hindrance until the pin 19 comes against the pawl 16 resting on the projection 23.

At the release of the disc 31 by the releasing lever 40 the projection 48² of the locking slide 48 has been released, so that this latter can sink down under the action of the spring 49 and its projecting portion 48¹ comes into the path of the releasing lever 18, so that this latter cannot return to its original position. It is therefore impossible in case of too early release of pressure on the releasing lever 18 for the pin 19 of the wheel 12 to be caught by the locking nose 18¹ of the said lever, so that the running off of the wheel 12 and consequently of the upper blind is not prevented. The release of the lever 18 is effected at the next operation of the shutter mechanism, the projecting face 31ᵇ of the disc 31 coming against the projection 48² of the locking slide 48 and raising this latter, whereby the projection 48¹ of the slide 48 is removed from the path of the projection 18² of the releasing lever 18 and this latter is enabled to return to its original position.

On tensioning the shutter mechanism by means of the winding device all the parts of the shutter return to their initial positions, because the toothed sector 57 which is rigidly connected to the winding lever 51 and the toothed wheel 58 loosely mounted on the spindle 17 and the toothed wheel 59 turn together. This last wheel operates the wheel 15 through the pin 59' mounted thereon and this wheel 15 again by means of the pawl 16 mounted thereon takes the wheel 12 with it, because the pawl 16 pushes the pin 19 fastened to the wheel 12 before it, until the pawl 16 is caught behind the locking tooth 18¹ of the releasing lever 18.

By means of the toothed wheel 59 moreover the intermediate wheels 36 and 35 are operated, the last of which is in engagement with the toothed wheel 32 loosely arranged on the spindle 2. The pin 33 attached to this wheel on the rotation of the wheel 32 takes with it the pin 31¹ attached to the disc 31 until the locking tooth of the releasing lever 40 falls into the notch 31ᶜ of the disc 31, whereupon the time regulator is wound. On releasing the hand-lever 51 this returns under the action of its spring 52 to its original position, whereupon the wheels 59, 36, 35 and 32 are brought back to their initial positions.

What I claim is:

1. In slot shutters for photographic cameras two blinds, springs therefor, means for varying the tension of said springs, and means for varying the width of the slot between the blinds, and a time regulator for measuring the time between release of the two blinds in combination with a setting disc adapted when turned in one direction from a normal position to operate the means for varying the tension of said springs and the means for varying the width of the slot and when turned in the other direction to operate the time regulator.

2. In slot shutters for photographic cameras the combination of a setting disc becoming effective on the rotation of the disc in the one or the other direction from a normal position and setting the shutter mechanism either for rapid or slow instantaneous exposures, an upper and a lower blind, springs for operating the blinds, a releasing device for the lower blind, a coupling device for the two blinds for determining the width of the slot between the blinds, a device for releasing the upper blind, a device for varying the tension of the springs for the rapid instantaneous exposures, a time regulator for measuring the time between the release of the lower and the upper blind at the slow instantaneous exposures and an intermediate gearing making operative according to the rotation of the setting disc in the one or the other direction either in the first case the above named coupling device for the two blinds and for determining the width of the slot between the blinds, the releasing device for the upper blind and the device for varying the tension of the springs, or in the second case the said time regulator acting upon the releasing device of the upper blind.

3. In slot shutters for photographic cameras the combination of a setting disc, an upper and a lower blind, springs for operating the blinds, a releasing device for the lower blind, a coupling device for the two blinds for determining the width of the slot between the blinds, a releasing device for the upper blind, a device for varying the tension of the springs operating the blinds, a time regulator acting upon the releasing device for the upper blind, an intermediate gearing making operative either the coupling device for the two blinds, the releasing device for the upper blind and the device for varying the tension of the springs or the time regulator and a locking device for preventing the releasing device for the lower blind in the case of slow instantaneous exposures from returning to its normal position and from locking the upper blind.

4. In slot shutters for photographic cameras the combination of a setting disc, an upper and a lower blind, springs for operating the blinds, a releasing device for the lower blind, a coupling device for the two blinds for determining the width of the slot between the blinds, a releasing device for the upper blind, a device for varying the tension of the springs operating the blinds, a time regulator acting upon the releasing device for the upper blind, an intermediate gearing making operative either the coupling device for the two blinds, the releasing device for the upper blind and the device for varying the tension of the springs or the time regulator, a locking device for preventing the releasing device of the lower blind in the case of slow instantaneous exposures from returning to its normal position and from locking the upper blind, and a winding device for winding up the blinds and for bringing all the parts in to the operative positions.

5. In slot shutters for photographic cameras the combination of a setting disc, an upper and a lower blind, springs for operating the blinds, a releasing device for the lower blind, consisting of a spindle, a two-armed lever (18) rotatably arranged thereon, a locking nose formed at the end of one of the arms of said lever and releasing the lower blind, if being swung around its spindle, a coupling device for the two blinds for determining the width of the slot between the blinds, a releasing device for the upper blind, a device for varying the tension of the springs operating the blinds, a time regulator acting upon the releasing device for the upper blind, an intermediate gearing making operative either the coupling device for the two blinds, the releasing device for the upper blind and the device for varying the tension of the springs or the time regulator, a locking device for preventing the releasing device of the lower blind in the case of slow instantaneous exposures from returning to its normal position and from locking the upper blind, and a winding device for winding up the blinds and for bringing all the parts back into their operative positions.

6. In slot shutters for photographic cameras the combination of a setting disc, an upper and a lower blind, springs for operating the blinds, a releasing device for the lower blind, a coupling device for the two blinds for determining the width of the slot between the blinds, consisting of a spindle (17), two toothed wheels (12 and 15) loosely arranged thereon and controlling the running off of the two blinds, a notched ring (11) coupled with one of the two said toothed wheels by means of a pin (11″) engaging with a certain amount of play with a recess (12′) provided in said toothed wheel (15), a spring (13) holding the said notched ring (11) in one of its extreme positions, a bushed wheel (9) with a projecting portion (10) at its periphery, covering on the rotation of said wheel (9) a variably greater number of the notches of said ring (11), a pawl (16) rotatably arranged on the one of the two toothed wheels (15), a pin (19) attached to the other toothed wheel (12), both being locked by the releasing device (18) and the first one being able to couple the two toothed wheels (15 and 12) by falling into the first free notch of the notched ring (11) after being released by the said releasing device of the lower blind and during the rotation of the said toothed wheel (15) controlling the running off of said lower blind, a toothed wheel (7) loosely arranged on said spindle (17) and coupled with the bushed wheel (9) by means of pins (8, 8'), a toothed wheel (5) being in engagement with said toothed wheel (7) and being driven on the rotation of the setting disc (1), a releasing device for the upper blind, a device for varying the tension of the springs operating the blinds, a time regulator acting upon the releasing device for the upper blind, an intermediate gearing making operative either the coupling device for the two blinds the releasing device for the upper blind and the device for varying the tension of the springs or the time regulator, a locking device for preventing the releasing device of the lower blind in the case of slow instantaneous exposures from returning to its normal position and from locking the upper blind, and a winding device for winding up the blinds and for bringing all the parts back into their operative positions.

7. In slot shutters for photographic cameras the combination of a setting disc, an upper and a lower blind, springs for operating the blinds, a releasing device for the lower blind, a coupling device for the two blinds for determining the width of the slot between the blinds, a releasing device for the upper blind, consisting of a locking lever (20) pivotally arranged, a locking nose (20¹) formed at the end thereof, a notch (21) in the notched ring (11) of the coupling device, a notch (20³) in the locking lever (20), a pin (22) carried by the toothed wheel (12) controlling the running off of the upper blind and becoming caught on the oscillation of said locking lever (20) by said notch (20³) and becoming free on the rotation of the notched ring or on giving free the releasing device (18) of the lower blind, and a spring (20²) bringing the locking lever (20) into engagement with the said notch (21) of said lever (20) at the manipulation of the releasing device (18) for the lower blind, a device for varying the tension of the springs operating the blinds, a time regulator acting upon the releasing device for the upper blind, an intermediate gearing making operative either the coupling device for the two blinds, the releasing device for the upper blind and the device for varying the tension of the springs in the case of the rapid instantaneous exposures or the time regulator, a locking device for preventing the releasing device for the lower blind in the case of the slow instantaneous exposures from returning to its normal position and from locking the upper blind, and a winding device for winding up the blinds and for bringing back all the parts into their operative positions.

8. In slot shutters for photographic cameras the combination of a setting disc, an upper and a lower blind, springs for operating the blinds, a releasing device for the lower blind, a coupling device for the two blinds for determining the width of the slot between the blinds, a releasing device for the upper blind, a device for varying the tension of the springs operating the blinds, consisting of a toothed wheel (4) secured to the hub of the setting disc, two toothed wheels (24, 24') fixed together on the same shaft (24²) and the first one of them being in engagement with the said toothed wheel (4), an intermediate gear wheel (25) meshing with the said toothed wheel (24'), a gear wheel (26) engaging said toothed wheel (25) and a shaft (6') carrying said gear wheel (26) and the springs (6) operating the blinds, a time regulator acting upon the releasing device for the upper blind, an intermediate gearing making operative either the coupling device for the two blinds, the releasing device for the upper blind and the device for varying the tension of the springs in the case of the rapid instantaneous exposures or the time regulator, a locking device for preventing the releasing device for the lower blind in the case of the slow instantaneous exposures from returning to its normal position and from locking the upper blind, and a winding device for winding up the blinds and for bringing back all the parts into their operative positions.

9. In slot shutters for photographic cameras the combination of a setting disc, an upper and a lower blind, springs for operating the blinds, a releasing device for the lower blind, a coupling device for the two blinds for determining the width of the slot between the blinds, a releasing device for the upper blind, a device for varying the tension of the springs operating the blinds, a time regulator acting upon the releasing device for the upper blind, consisting of a disc (41) secured to the hub of the setting disc and being partially toothed, a disc (31) loosely arranged on the hub of the setting disc, a two-armed anchor pivotally arranged on said disc (31), a double pinion (42, 43), one portion of which being in engagement with the toothed portion of said disc (41), the other portion being alternately acted upon by the arms of said anchor, a spring (38) fixed with the one end to the said disc (31) and at the other end to a pin (39) and being tensioned at the rotation of the said disc (31), a two-armed releasing lever (40) pivotally arranged, a notch (31ᶜ) in the said disc (31) being engaged by one end of said releasing lever (40), a pin (15²) on the toothed wheel (15) controlling the running off of the lower blind and acting upon the other end of said releasing lever (40) on the rotation of said toothed wheel (15), a projection (31ᵃ) on the said disc (31), a pivotally arranged bell-crank lever (44) having two arms (44¹ and 44²), the first being acted upon by the projection (31ᵃ) of said disc (31) and being oscillated around its pivot, a pin (44³) secured to the other arm (44²) of said lever (44) and an extension (20⁴) of the said locking lever (20) being influenced by said pin (44³) on the rotation of said lever (44) and causing the release of the pin (22) of the toothed wheel (12) controlling the upper blind from the notch (20³) of said locking lever (20), an intermediate gearing making operative either the coupling device for the two blinds, the releasing device for the upper blind and the device for varying the tension of the springs in the case of the rapid instantaneous exposures or the time regulator, a locking device for preventing the releasing device for the lower blind in the case of the slow instantaneous exposures from returning to its normal position and from locking the upper blind, and a winding device for winding up the blinds and for bringing back all the parts into their operative positions.

10. In slot shutters for photographic cameras the combination of a setting disc, an upper and a lower blind, springs for operating the blinds, a releasing device for the lower blind, a coupling device for the two blinds for determining the width of the slot between the blinds, a releasing device for the upper blind, a device for varying the tension of the springs operating the blinds, a time regulator acting upon the releasing device for the upper blind, an intermediate gearing making operative either the coupling device for the two blinds, the releasing device for the upper blind and the device for varying the tension of the springs in the case of the rapid instantaneous exposures or the time regulator consisting of two wheels (3 and 4) fixed to the hub of the setting disc and having toothed portions (3' and 4') being so dimensioned and arranged, that the latter engage with the said intermediate gear wheel (5) for operating the coupling device of the blinds and with the gear wheel (24) for the alteration of the tension of the springs only if the setting disc is rotated for setting one of the rapid instantaneous exposures, a cam-disc (27) secured to the hub of the setting disc, a pivotally arranged contact lever (29) rigidly connected to a spring actuated lever (30) and acted upon by the cam (27') of the cam-disc (27) in the case of the slow instantaneous exposures and a pin (31¹) on the disc (31) of the time regulator, being released on the oscillation of the said levers (29, 30) and permitting the running off of the time regulator under the action of its spring (38), a locking device for preventing the releasing device for the lower blind in the case of the slow instantaneous exposures from returning to its normal position and from locking the upper blind, and a winding device for winding up the blinds and for bringing back all the parts into their operative positions.

11. In slot shutters for photographic cameras the combination of a setting disc, an upper and a lower blind, springs for operating the blinds, a releasing device for the lower blind, a coupling device for the two blinds for determining the width of the slot between the blinds, a releasing device for the upper blind, a device for varying the tension of the springs operating the blinds, a time regulator acting upon the releasing device for the upper blind, an intermediate gearing making operative either the coupling device for the two blinds, the releasing device for the upper blind and the device for varying the tension of the springs in the case of the rapid instantaneous exposures or the time regulator, a locking device for preventing the releasing device for the lower blind in the case of the slow instantaneous exposures from returning to its normal position and from locking the upper blind, consisting of a pivotally arranged two-armed lever (47) influenced by the cam (27') of the cam-disc (27), a movably arranged and spring actuated slide 48 being lifted during the rapid instantaneous exposures by the said lever (47) and allowed to sink down during the slow instantaneous exposures, a projection (18³) on the releasing lever (18), a projection (48¹) on the slide (48) locking said projection (18³) at the downward movement of the slide and preventing the releasing lever (18) from returning to its normal position, a second projection (48²) on the slide (48) and a projection (31ᵇ) on the disc (31) of the time regulator, pushing on the winding movement of the latter against said projection (48²) and thereby lifting the slide for releasing the projection (18³) of the releasing lever (18), and a winding device for winding up the blinds and for bringing back all the parts into their operative positions.

12. In slot shutters for photographic cameras the combination of a setting disc, an upper and a lower blind, springs for operating the blinds, a releasing device for the lower blind, a coupling device for the two blinds for determining the width of the slot between the blinds, a releasing device for the upper blind, a device for varying the tension of the springs operating the blinds, a time regulator acting upon the releasing device for the upper blind, an intermediate gearing making operative either the coupling device for the two blinds, the releasing device for the upper blind and the device for varying the tension of the springs in the case of the rapid instantaneous exposures or the time regulator, a locking device for preventing the releasing device for the lower blind in the case of the slow instantaneous exposures from returning to its normal position and from locking the upper blind, and a winding device for winding up the blinds and for bringing back all the parts into their operative positions, consisting of a spindle (50), two toothed wheels (53, 54) loosely arranged thereon and engaging with the above-named toothed wheels (12, 15), a toothed sector (57) secured to the spindle (50), a hand lever (51) also secured to the spindle (50), a spring (52) attached with one end to the said spindle (50) and with the other to a stationary pin for bringing back the spindle (50), the lever (51) and the toothed sector (57) to their initial position, a toothed wheel (58) loosely arranged on the spindle (17) and in engagement with the said toothed sector (57), a toothed wheel (59) rigidly connected with said toothed wheel (58), a pin (59') on said toothed wheel (59), a curved slot (60) in the toothed wheel (15) controlling the running off of the lower blind and engaged by said pin (59'), an intermediate wheel (36), a double pinion (35) meshing with said wheel (36), a toothed wheel (32) loosely arranged on the spindle of the setting disc and in engagement with said pinion (35) and a pin (33) on the toothed wheel (32) acting upon the pin (31¹) of the disc (31) of the time regulator for tensioning the latter.

In testimony whereof I affix my signature.

FRIEDRICH GROSSE.